United States Patent [19]
Ohashi

[11] Patent Number: 5,153,779
[45] Date of Patent: Oct. 6, 1992

[54] LENS FOR READING ORIGINAL

[75] Inventor: Kazuyasu Ohashi, Funabashi, Japan

[73] Assignee: Ricoh Co., Ltd., Tokyo, Japan

[21] Appl. No.: 746,727

[22] Filed: Aug. 19, 1991

[30] Foreign Application Priority Data

Aug. 21, 1990 [JP] Japan .................................. 2-219779

[51] Int. Cl.$^5$ ................................................ G02B 9/34
[52] U.S. Cl. .................................... 359/770; 359/763
[58] Field of Search ............... 359/754, 763, 770, 689, 359/787, 796, 797, 781, 782, 783

[56] References Cited

FOREIGN PATENT DOCUMENTS

| 1293469 | 4/1969 | Fed. Rep. of Germany | ...... 359/770 |
| 2715278 | 10/1977 | Fed. Rep. of Germany | ...... 359/770 |
| 6411216 | 1/1964 | Japan . | |
| 1-183614 | 7/1989 | Japan . | |

*Primary Examiner*—Janice A. Howell
*Assistant Examiner*—Don Wong
*Attorney, Agent, or Firm*—Fish & Richardson

[57] ABSTRACT

A lens for reading an original has first to fifth lens groups sequentially arranged from an object side of a lens system to an image side thereof. The first lens group is constructed by a first lens composed of a negative meniscus lens having a convex face directed on the object side. The second lens group is constructed by a second lens composed of a positive lens. The third lens group is constructed by a third lens composed of a biconcave lens. The fourth lens group is constructed by a fourth lens composed of a positive lens. The fifth lens group is constructed by a fifth lens composed of a positive meniscus lens having a convex face directed on the object side. A combined focal length f of the entire lens system, a focal length $f_1$ of the first lens group, and a combined focal length $f_{24}$ of the second to fourth lens groups satisfy the following conditions.

$$-2.4 < (f_1/f) < -1.2 \qquad (I)$$

$$0.85 < (f_{24}/f) < 1.5 \qquad (II).$$

3 Claims, 6 Drawing Sheets

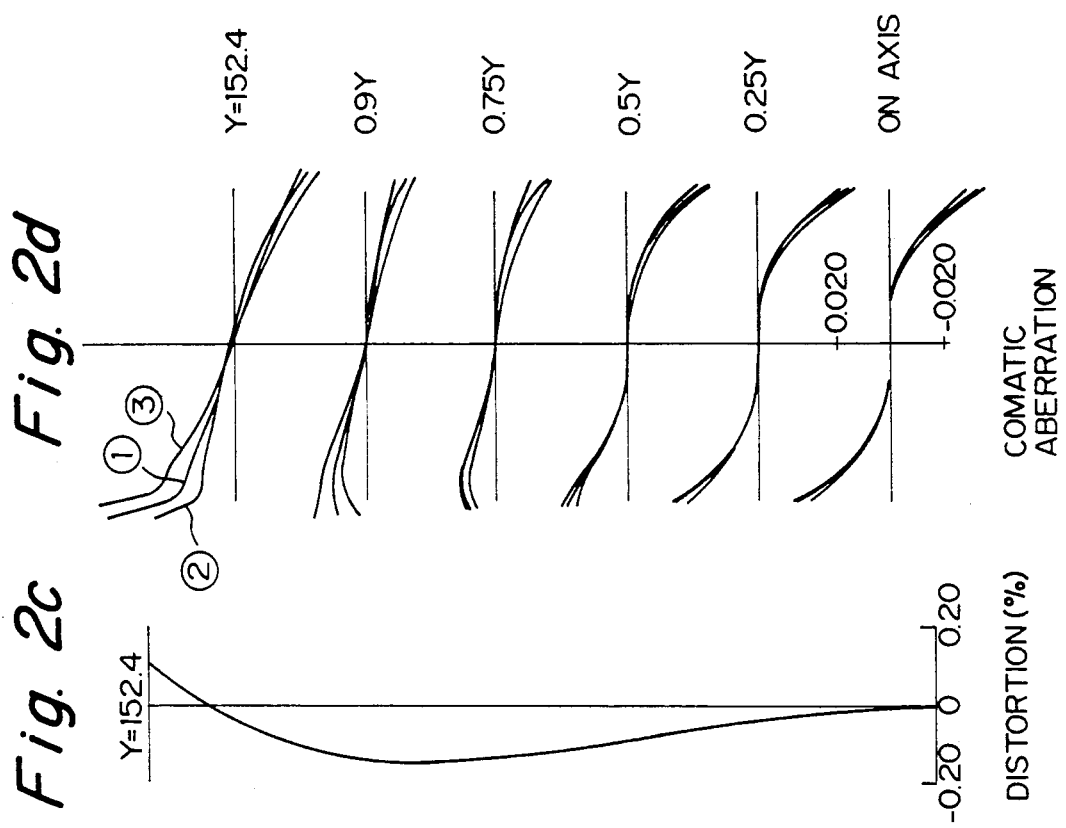
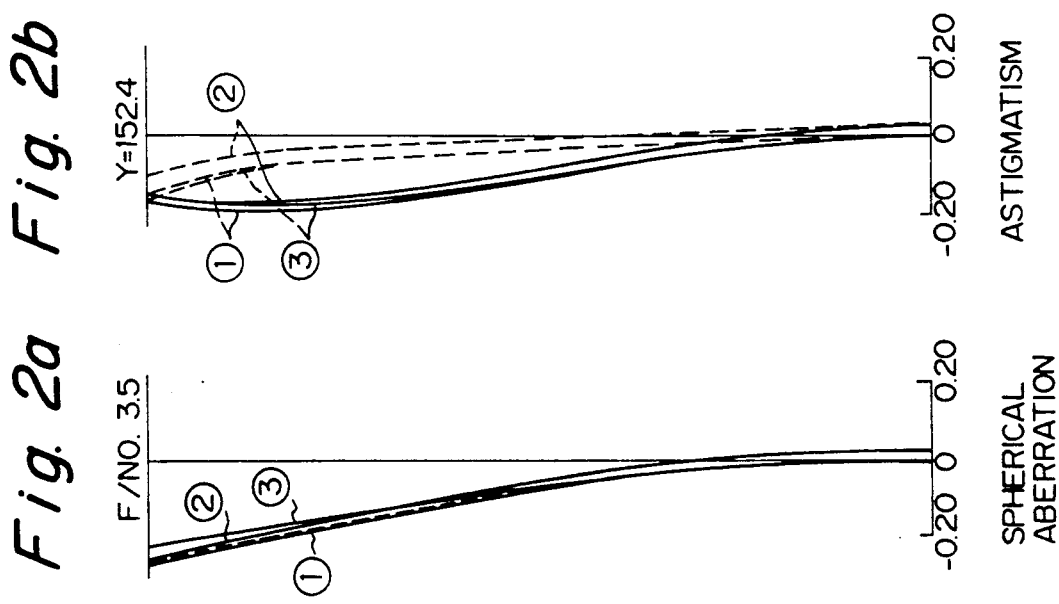

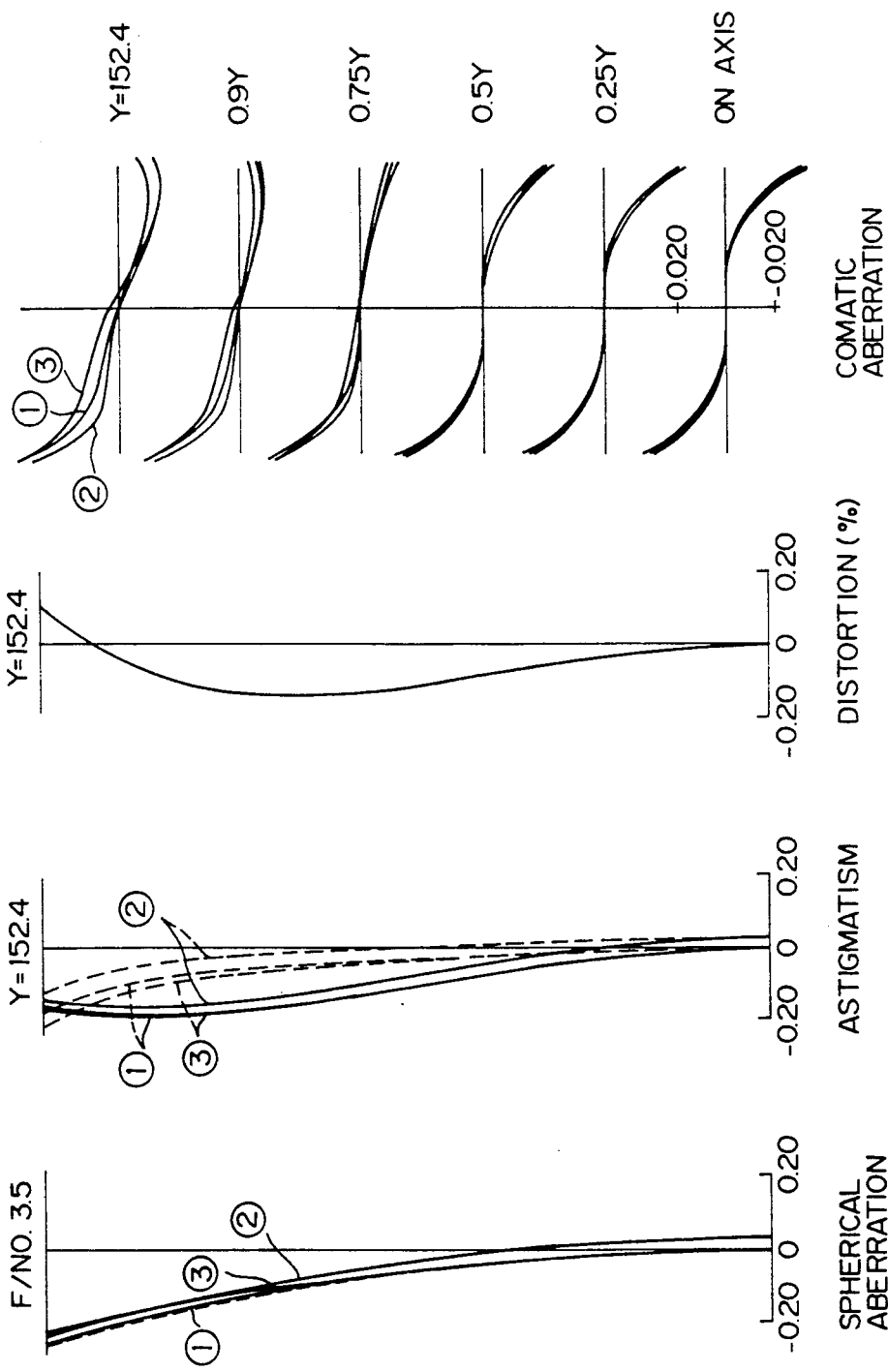

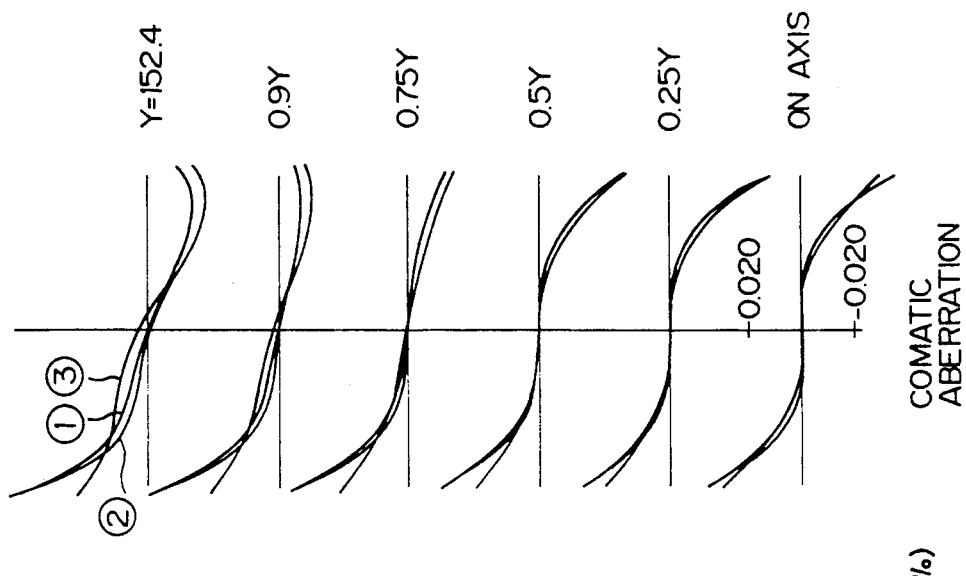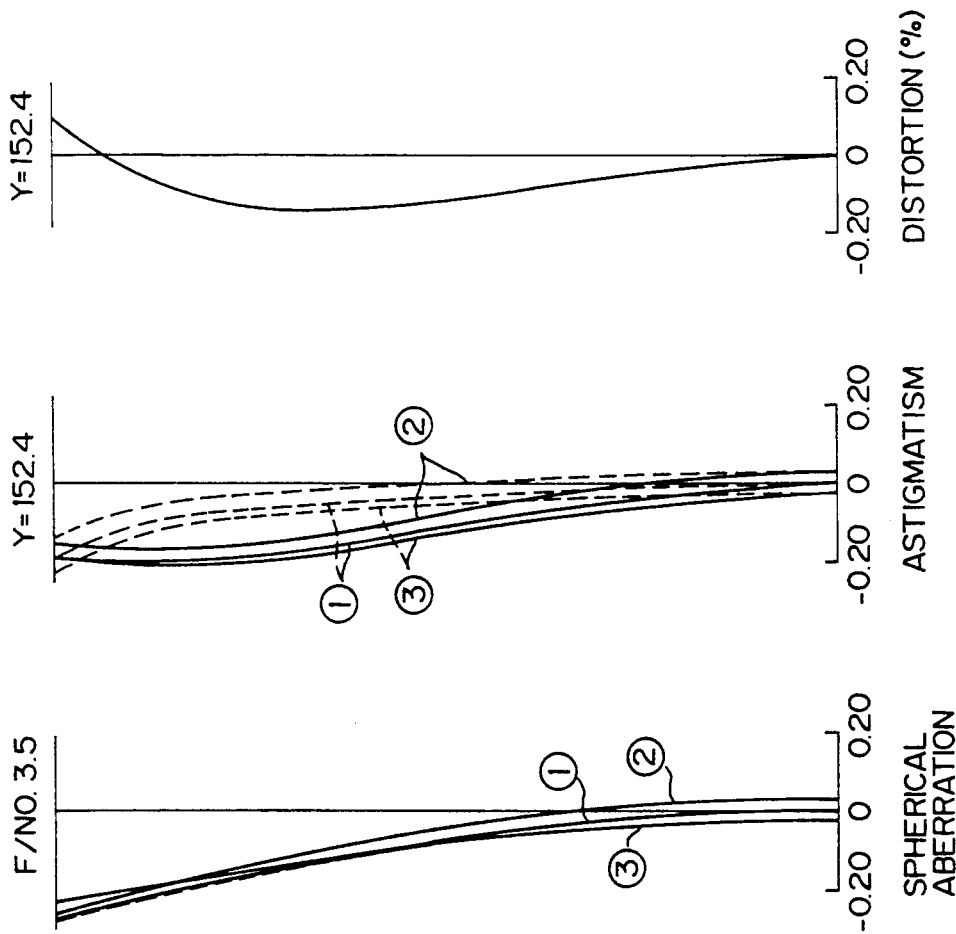

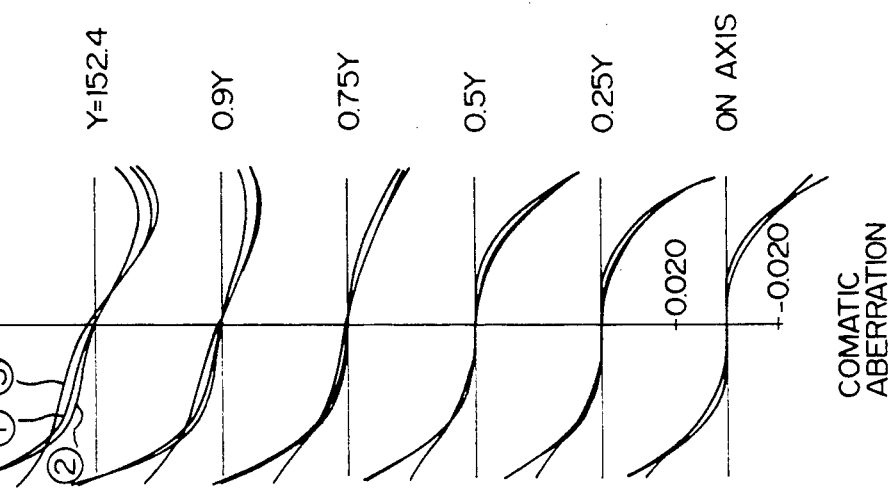
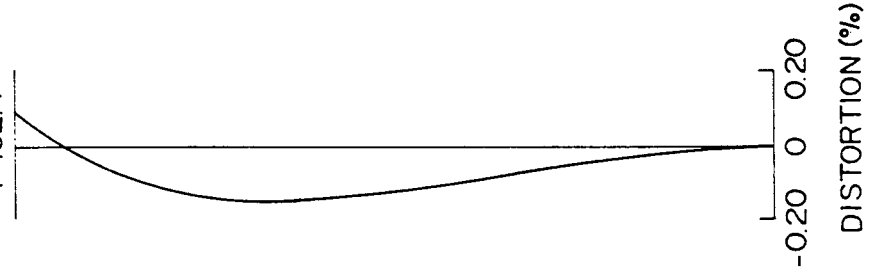
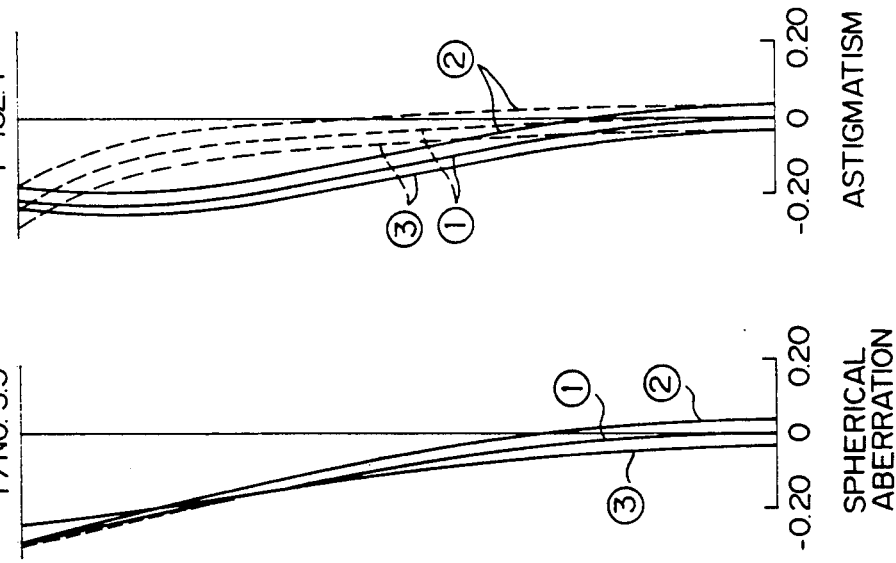

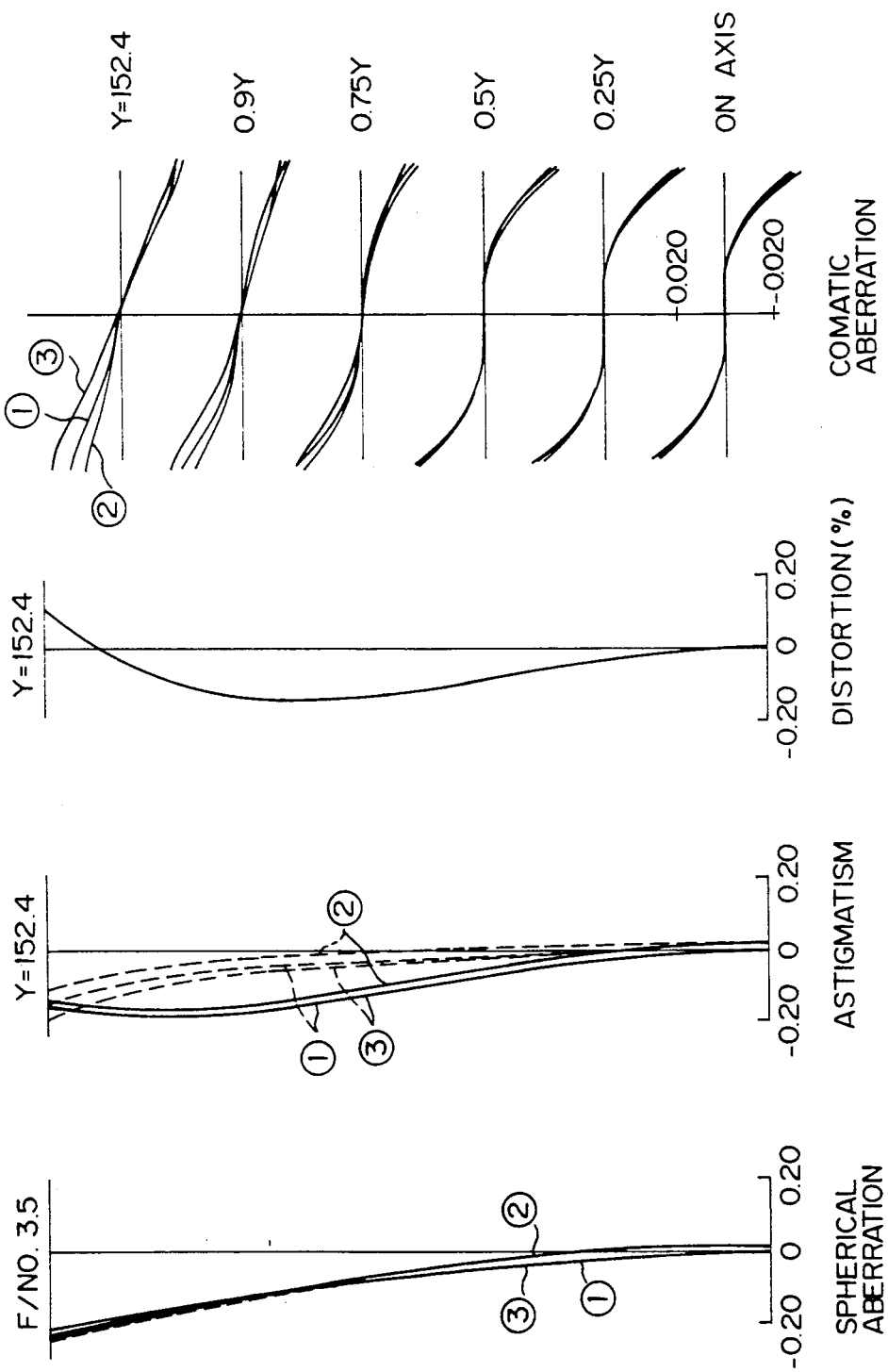

LENS FOR READING ORIGINAL

BACKGROUND OF THE INVENTION

1. Field of the Invention

The present invention relates to a lens for reading an original and used in an original reader, etc.

2. Description of the Related Art

An original reading system for scanning an original and reading an image of the original by an image pickup element such as a charge coupled device (CCD) is used in a facsimile, an image scanner, a digital copying machine, etc. A lens for reading the original is a lens for focusing and forming a reduced image of the original onto the image pickup element in such an original reading system.

With respect to the lens for reading an original, it is generally necessary to focus and form an image having a high contrast on an original face at a high spatial frequency until 4 line pair/mm so as to accurately read the original. Further, it is also necessary that a vignetting factor is equal to 100% until a peripheral portion of this image.

In general, a known lens for reading an original is constructed by a lens of a Gauss type, a frog type, a triplet type, a topogon type, etc.

The lens for reading an original preferably has a wide field angle to reduce a distance between an object and an image formed by this lens such that an original reader is made compact. Further, this lens preferably has a large aperture and a large brightness as much as possible to read the original at a high speed.

The general lens of a Gauss type, etc. are not necessarily constructed sufficiently in consideration of the wide field angle, the large aperture and the large brightness.

Namely, the lens of a Gauss type is suitable for the large aperture, but is not suitable for the wide field angle. The lenses of frog and triplet types have a small half field angle of about 20 degrees and a small brightness of about an F-number F/No.=4.5 to 5.6. The lens of a topogon type has a relatively wide field angle, but has a small half field angle of about 23 degrees.

SUMMARY OF THE INVENTION

It is therefore an object of the present invention to provide a novel lens for reading an original in which an F-number is equal to 3.5 showing a bright state and a half field angle is equal to 30 degrees showing a wide field angle and a vignetting factor is equal to or greater than 100% until a peripheral portion of an image formed by this lens, thereby providing an image having a high contrast.

The above object of the present invention can be achieved by a lens for reading an original, comprising first to fifth lens groups sequentially arranged from an object side of a lens system to an image side thereof; the first lens group being constructed by a first lens composed of a negative meniscus lens having a convex face directed on the object side; the second lens group being constructed by a second lens composed of a positive lens; the third lens group being constructed by a third lens composed of a biconcave lens; the fourth lens group being constructed by a fourth lens composed of a positive lens; and the fifth lens group being constructed by a fifth lens composed of a positive meniscus lens having a convex face directed on the object side; a combined focal length f of the entire lens system, a focal length $f_1$ of the first lens group, and a combined focal length $f_{24}$ of the second to fourth lens groups satisfying the following conditions.

$$-2.4 < (f_1/f) < -1.2 \qquad (I)$$

$$0.85 < (f_{24}/f) < 1.5 \qquad (II).$$

In accordance with the above structure of the original reading lens, an F-number is equal to 3.5 showing a bright state and a half field angle is equal to 30 degrees showing a wide field angle. Further, a vignetting factor is equal to or greater than 100% until a peripheral portion of an image formed by this lens, thereby providing an image having a high contrast.

Further objects and advantages of the present invention will be apparent from the following description of the preferred embodiments of the present invention as illustrated in the accompanying drawings.

BRIEF DESCRIPTION OF THE DRAWINGS

FIGS. 2a, 2b, 2c, 2d to 6a, 6b, 6c, 6d are respectively aberration diagrams of the original reading lens in accordance with first to fifth embodiments of the present invention.

DESCRIPTION OF THE PREFERRED EMBODIMENTS

Figure 1:
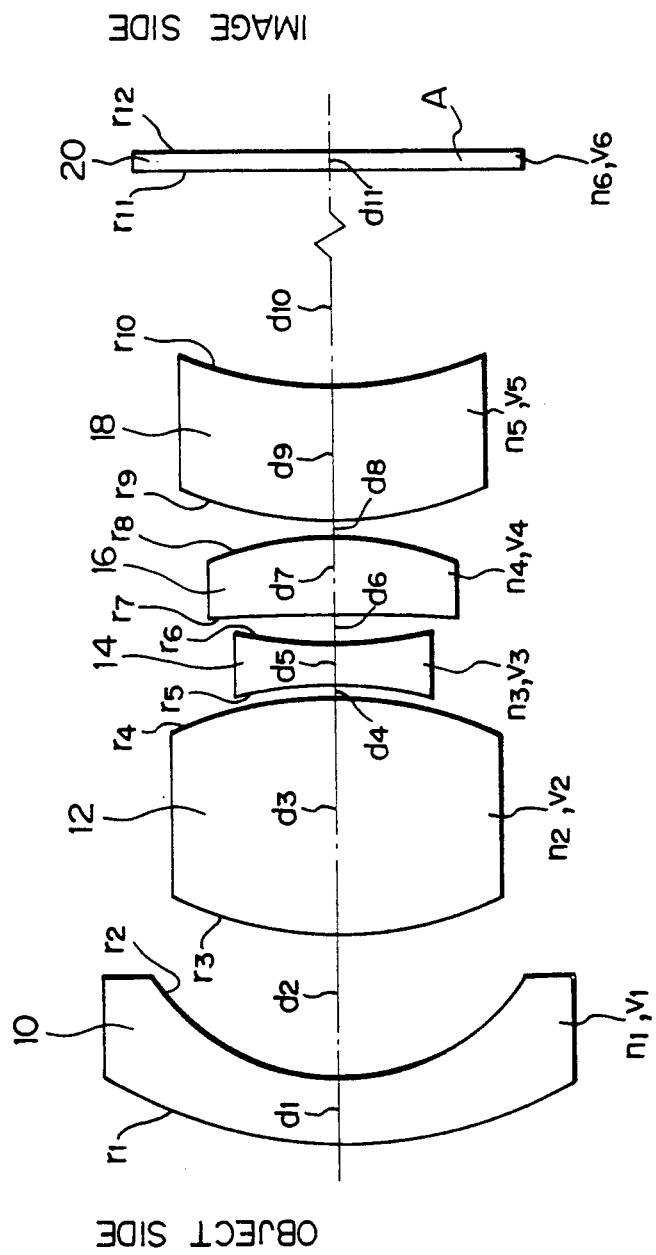
FIG. 1 is a view for explaining the construction of a lens for reading an original in the present invention.

The preferred embodiments of a lens for reading an original in the present invention will next be described in detail with reference to the accompanying drawings.

In the present invention, a lens for reading an original has first to fifth lens groups sequentially arranged from an object side of a lens system to an image side thereof.

As shown in FIG. 1, the first lens group is arranged on a most object side of the lens system (leftward in FIG. 1). The first lens group is constructed by a first lens 10 composed of a negative meniscus lens having a convex face directed on the object side. The second lens group is constructed by a second lens 12 composed of a positive lens. The third lens group is constructed by a third lens 14 composed of a biconcave lens. The fourth lens group is constructed by a fourth lens 16 composed of a positive lens. The fifth lens group is arranged on a most image side of the lens system and is constructed by a fifth lens 18 composed of a positive meniscus lens having a convex face directed on the object side. Thus, the entire lens system is constructed by the five lens groups composed of five lenses.

A combined focal length f of the entire lens system, a focal length $f_1$ of the first lens group, and a combined focal length $f_{24}$ of the second to fourth lens groups satisfy the following conditions.

$$-2.4 < (f_1/f) < -1.2 \qquad (I)$$

$$0.85 < (f_{24}/f) < 1.5 \qquad (II).$$

In FIG. 1, reference numeral 20 designates a cover glass on a light-receiving face of an image pickup element.

The lens for reading an original in the present invention is basically of a retrofocusing type. The original reading lens of this type can provide a wide field angle and a vignetting factor equal to or greater than 100% by a negative lens located in a front portion of this original reading lens. However, it is difficult to correct divergent aberration caused by this negative lens.

It is necessary to suitably set refracting power of the first lens group so as to preferably correct aberrations in the lens construction of the present invention.

The above condition (I) is a condition for restricting the refracting power of the first lens group. When the ratio in this condition (I) exceeds a lower limit thereof, a comatic flare is severely caused so that it is impossible to form an image having a high contrast. In contrast to this, when the ratio in this condition (I) exceeds an upper limit thereof, a distance required between the first and second lens groups is increased and an entire length of the lens system is increased so that it is difficult to make an original reader compact.

In the lens construction of the present invention, the second to fourth lens groups can be considered as a triplet lens system having strong positive refracting power. To preferably correct aberrations in the lens construction of the present invention, it is necessary that refracting power of this triplet lens system is set to be approximately equal to refracting power of the entire lens system.

The above condition (II) is a condition for setting the refracting power of the triplet lens system to be approximately equal to the refracting power of the entire lens system. When the ratio in this condition (II) exceeds a lower limit thereof, a Petzval's sum of the entire lens system is excessively corrected. Therefore, an image surface is inclined on an image side of the lens system so that field curvature is increased on a sagittal plane. In contrast to this, when the ratio in the condition (II) exceeds an upper limit thereof, the Petzval's sum of the entire lens system is insufficiently corrected. Therefore, an image surface is inclined on an object side of the lens system and an astigmatic difference is increased. Accordingly, a lens performance outside an optical axis of the lens system is reduced when the ratio in the condition (II) exceeds the lower and upper limits thereof.

In the lens construction of the present invention, the refracting power to be born by the triplet lens system (the second to fourth lenses) is reduced by arranging the positive lens as the fifth lens, whereby respective aberrations to be produced in the triplet lens system are suppressed. Furthermore, a curvature center of the second refracting face of the fifth lens can be positioned in the vicinity of an image surface by using the fifth lens composed of a meniscus lens having a convex face directed on the object side, thereby making it possible to correct only an aberration outside an optical axis of the entire lens system without changing an aberration on the optical axis.

Five concrete Embodiments of the present invention will next be described.

In each of the concrete Embodiments, reference numeral f designates a combined focal length of the entire lens system. Reference numeral $f_1$ designates a focal length of the first lens group. Reference numeral $f_{24}$ designates a combined focal length of lenses from the second lens group to the fourth lens group. Reference numerals m, $\omega$ and F/No respectively designate a magnification, a half field angle and an F-number. As shown in FIG. 1, reference numeral $r_i$ (i=1 to 12) designates a radius of curvature of an i-th lens face counted from an object side of the lens system. This i-th lens face includes a cover glass face of an image sensor. Reference numeral $d_i$ (i=1 to 11) designates an axial distance between the i-th lens face and an (i+1)-th lens face. Further, reference numerals $n_j$ and $\nu_j$ (j=1 to 6) respectively designate a refractive index and an Abbe number of a j-th lens including the cover glass and counted from the object side of the lens system.

Embodiment 1
f = 21.4 mm, F/No = 3.5, m = 0.088, $\omega$ = 30.0°
$f_1/f$ = −1.485, $f_{24}/f$ = 0.971

| i | $r_i$ | $d_i$ | j | $n_j$ | $\nu_j$ |
|---|---|---|---|---|---|
| 1 | 19.059 | 2.234 | 1 | 1.48749 | 70.21 |
| 2 | 8.216 | 6.199 | | | |
| 3 | 14.872 | 10.000 | 2 | 1.78300 | 36.15 |
| 4 | −15.203 | 0.050 | | | |
| 5 | −14.966 | 1.751 | 3 | 1.84666 | 23.89 |
| 6 | 17.200 | 1.256 | | | |
| 7 | −58.786 | 3.317 | 4 | 1.75500 | 52.33 |
| 8 | −11.878 | 0.050 | | | |
| 9 | 15.370 | 5.996 | 5 | 1.75500 | 52.33 |
| 10 | 15.731 | 16.794 | | | |
| 11 | ∞ | 0.700 | 6 | 1.51633 | 64.15 |
| 12 | ∞ | | | | |

Embodiment 2
f = 21.4 mm, F/No = 3.5, m = 0.088, $\omega$ = 30.0°
$f_1/f$ = −1.513, $f_{24}/f$ = 1.041

| i | $r_i$ | $d_i$ | j | $n_j$ | $\nu_j$ |
|---|---|---|---|---|---|
| 1 | 23.705 | 0.800 | 1 | 1.51728 | 69.56 |
| 2 | 9.072 | 7.824 | | | |
| 3 | 15.891 | 10.000 | 2 | 1.88300 | 40.78 |
| 4 | −97.773 | 0.198 | | | |
| 5 | −34.075 | 4.142 | 3 | 1.84666 | 23.89 |
| 6 | 17.532 | 1.231 | | | |
| 7 | −543.236 | 2.198 | 4 | 1.67000 | 57.33 |
| 8 | −12.552 | 0.050 | | | |
| 9 | 17.346 | 8.172 | 5 | 1.75500 | 52.33 |
| 10 | 19.501 | 15.167 | | | |
| 11 | ∞ | 0.700 | 6 | 1.51633 | 64.15 |
| 12 | ∞ | | | | |

Embodiment 3
f = 21.4 mm, F/No = 3.5, m = 0.088, $\omega$ = 30.0°
$f_1/f$ = −2.183, $f_{24}/f$ = 1.350

| i | $r_i$ | $d_i$ | j | $n_j$ | $\nu_j$ |
|---|---|---|---|---|---|
| 1 | 21.664 | 0.800 | 1 | 1.49700 | 81.61 |
| 2 | 11.069 | 14.467 | | | |
| 3 | 13.282 | 8.244 | 2 | 1.74400 | 44.79 |
| 4 | 612.415 | 0.353 | | | |
| 5 | −23.645 | 2.248 | 3 | 1.75520 | 27.51 |
| 6 | 15.202 | 1.067 | | | |
| 7 | −405.427 | 1.156 | 4 | 1.67790 | 55.33 |
| 8 | −12.416 | 0.050 | | | |
| 9 | 15.800 | 8.885 | 5 | 1.67790 | 55.33 |
| 10 | 21.041 | 15.371 | | | |
| 11 | ∞ | 0.700 | 6 | 1.51633 | 64.15 |
| 12 | ∞ | | | | |

Embodiment 4
f = 21.4 mm, F/No = 3.5, m = 0.088, $\omega$ = 30.0°
$f_1/f$ = −2.135, $f_{24}/f$ = 1.308

| i | $r_i$ | $d_i$ | j | $n_j$ | $\nu_j$ |
|---|---|---|---|---|---|
| 1 | 18.192 | 0.800 | 1 | 1.49700 | 81.61 |
| 2 | 9.953 | 13.137 | | | |
| 3 | 11.842 | 7.426 | 2 | 1.69500 | 42.16 |
| 4 | −177.798 | 0.294 | | | |
| 5 | −20.457 | 0.964 | 3 | 1.75084 | 27.69 |
| 6 | 13.895 | 1.193 | | | |
| 7 | −115.918 | 1.242 | 4 | 1.65100 | 56.15 |
| 8 | −10.861 | 0.050 | | | |
| 9 | 15.559 | 8.834 | 5 | 1.65100 | 56.15 |
| 10 | 20.751 | 15.548 | | | |

-continued

Embodiment 4
f = 21.4 mm, F/No = 3.5, m = 0.088, ω = 30.0°
$f_1/f = -2.135$, $f_{24}/f = 1.308$

| i | $r_i$ | $d_i$ | j | $n_j$ | $v_j$ |
|---|---|---|---|---|---|
| 11 | ∞ | 0.700 | 6 | 1.51633 | 64.15 |
| 12 | ∞ | | | | |

Embodiment 5
f = 21.4 mm, F/No = 3.5, m = 0.088, ω = 30.0°
$f_1/f = -1.374$, $f_{24}/f = 0.943$

| i | $r_i$ | $d_i$ | j | $n_j$ | $v_j$ |
|---|---|---|---|---|---|
| 1 | 20.389 | 0.800 | 1 | 1.54135 | 71.94 |
| 2 | 8.814 | 4.562 | | | |
| 3 | 15.098 | 10.000 | 2 | 1.88827 | 36.09 |
| 4 | −33.432 | 0.068 | | | |
| 5 | −27.939 | 3.208 | 3 | 1.92300 | 20.90 |
| 6 | 18.155 | 0.620 | | | |
| 7 | −55.598 | 4.899 | 4 | 1.70898 | 54.76 |
| 8 | −11.528 | 0.050 | | | |
| 9 | 17.185 | 6.379 | 5 | 1.88300 | 40.80 |
| 10 | 17.630 | 15.982 | | | |
| 11 | ∞ | 0.700 | 6 | 1.51633 | 64.15 |
| 12 | ∞ | | | | |

FIGS. 2a, 2b, 2c and 2d respectively show diagrams of spherical aberration, astigmatism, distortion and comatic aberration of the lens for reading an original in accordance with Embodiment 1 of the present invention. FIGS. 3a, 3b, 3c and 3d respectively show diagrams of spherical aberration, astigmatism, distortion and comatic aberration of the lens for reading an original in accordance with Embodiment 2 of the present invention. FIGS. 4a, 4b, 4c and 4d respectively show diagrams of spherical aberration, astigmatism, distortion and comatic aberration of the lens for reading an original in accordance with Embodiment 3 of the present invention. FIGS. 5a, 5b, 5c and 5d respectively show diagrams of spherical aberration, astigmatism, distortion and comatic aberration of the lens for reading an original in accordance with Embodiment 4 of the present invention. FIGS. 6a, 6b, 6c and 6d respectively show diagrams of spherical aberration, astigmatism, distortion and comatic aberration of the lens for reading an original in accordance with Embodiment 5 of the present invention.

In the respective aberration diagrams, reference numerals ①, ② and ③ respectively relate to lines d, c and F. In the diagrams of spherical aberration, a broken line shows a sine condition. In the diagrams of astigmatism, solid and broken lines respectively show radial and tangential aberrations.

In the respective Embodiments 1 to 5, the above aberrations are preferably corrected.

As mentioned above, in accordance with the present invention, it is possible to provide a novel lens for reading an original. This lens has a half field angle of 30 degrees showing a wide field angle and a vignetting factor equal to or greater than 100% until a peripheral portion of an image formed by this lens. Further, this lens has a high contrast with respect to this image and an F-number of 3.5 showing a bright state. Accordingly, it is possible to provide a compact original reader operated at a high speed by using this lens.

Many widely different embodiments of the present invention may be constructed without departing from the spirit and scope of the present invention. It should be understood that the present invention is not limited to the specific embodiments described in the specification, except as defined in the appended claims.

What is claimed is:

1. A lens for reading an original, comprising:
    first to fifth lens groups sequentially arranged from an object side of a lens system to an image side thereof;
    the first lens group being constructed by a first lens composed of a negative meniscus lens having a convex face directed on the object side;
    the second lens group being constructed by a second lens composed of a positive lens;
    the third lens group being constructed by a third lens composed of a biconcave lens;
    the fourth lens group being constructed by a fourth lens composed of a positive lens; and
    the fifth lens group being constructed by a fifth lens composed of a positive meniscus lens having a convex face directed on the object side;
    a combined focal length f of the entire lens system, a focal length $f_1$ of the first lens group, and a combined focal length $f_{24}$ of the second to fourth lens groups satisfying the following conditions, $$-2.4 < (f_1/f) < -1.2 \tag{I}$$

$$0.85 < (f_{24}/f) < 1.5 \tag{II}.$$

2. An original reading lens as claimed in claim 1, wherein the condition (I) is a condition for restricting refracting power of the first lens group.

3. An original reading lens as claimed in claim 1, wherein the condition (II) is a condition for setting refracting power of the second to fourth lens groups to be approximately equal to refracting power of the entire lens system.

* * * * *